United States Patent Office 3,218,759
Patented Nov. 23, 1965

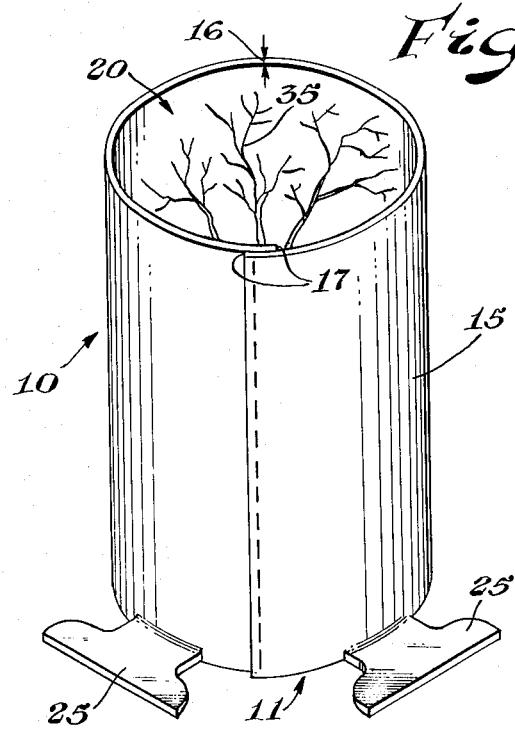
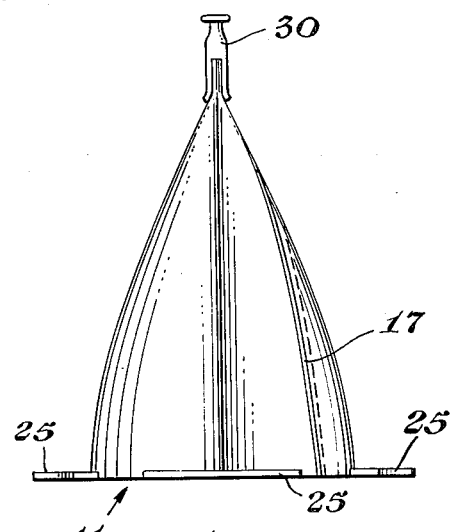
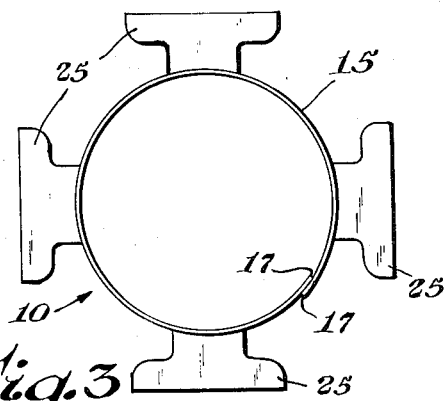
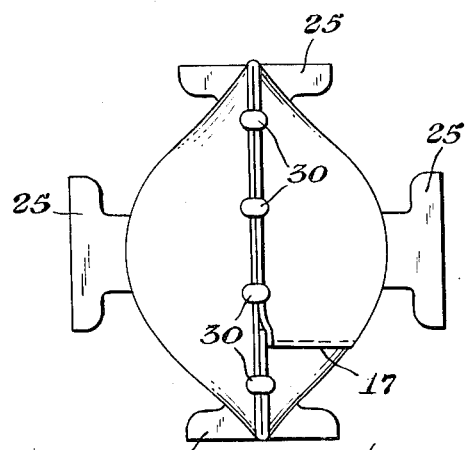
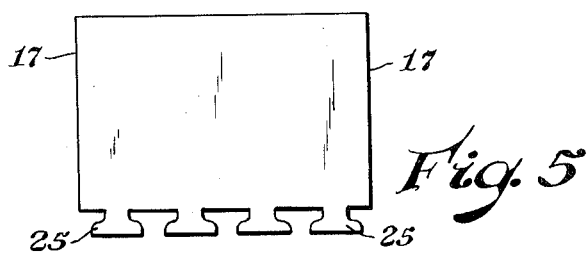
INVENTOR.
Keith C. Barrons

3,218,759
PLANT PROTECTION DEVICE
Keith C. Barrons, Midland, Mich., assignor to The Dow Chemical Company, Midland, Mich., a corporation of Delaware
Filed Nov. 30, 1961, Ser. No. 156,173
7 Claims. (Cl. 47—30)

The present invention relates to horticulture and is particularly directed to a method of protecting woody plants from winter injury, and to an article of manufacture with which to carry out the method.

Many kinds of plants produce, by vigorous growth during a principal growing season, substantial woody stems. In some semi-hardy plants these stems then become dormant, or at least quiescent. In others they retain their foliage: they are, that is, evergreen. These tops would, in effect, be perennial except that, in many localities that do not have highly specialized climatic conditions, the woody tops of these plants are susceptible of winter killing. In plants that have crowns at or near the earth surface, such killing may occur as far back as the plant crown (at or near the earth's surface). Exposure to such injurious climatic conditions, as to time of occurrence, follows the said principal growing season, when deciduous tops are dormant, and persistent or evergreen tops are quiescent. Accordingly, in many climates, such plants can often be grown only to such stature as is achieved in growth of a single year from a crown at or near the surface of the earth. Plants without such crowns can often not be caused to survive a winter.

The specialized climatic conditions under which such woody top structures persist safely from year to year are not necessarily characterized by being consistently warm. Humidity during the dormant season and the absence of strong sunlight from a relatively low angle may be more helpful to assure survival than mild temperatures. Winter killing is often more closely related to irregularities of temperature, to sunburn of tender stems having thin bark, and to dehydration, than to exposure to temperatures lower than the freezing temperature of water under otherwise favorable conditions. This is especially likely to be true in the case of semi-hardy woody plants at the northern or southern extremes of the north and south temperate climatic zones respectively, within which they are adapted to grow as hardy perennials. This is most especially true of semi-hardy dicotyledonous evergreens.

Accordingly, it is an object of the present invention to protect from winter killing, the woody tops of plants growing in earth and producing woody tops. It is a further object of the present invention to provide for improved winter survival of a perennial above-ground structure of a semi-hardy shrub or small tree of greater stature than has hitherto been possible, as a basis for new growth. It is a further object of the present invention to provide an article of manufacture by the use of which to make possible the achievement of the present objects. Other objects will become apparent in the following specification and claims.

According to the present invention, I have discovered that the woody stem or top of a plant producing a semi-hardy woody stem or top susceptible of winter killing, including a plant growing from a perennial crown at or near the surface of the earth, can be protected effectively from adverse dormant season climatic influences by the step of positioning adjacent said plant, after the principal growing season of said plant but before winter kill of said tops occurs, a protective cover structure having a major vertical axis and substantially parallel thereto a self-supporting wall that defines an upper and a lower end, each end essentially in a plane, said wall being curved and closed, said major vertical axis intersecting said lower end plane in an angle of not less than about 85 degrees, said structure being open at the upper and lower end and openably closable by flexure at the upper end; being composed essentially of tough, fairly rigid, yet pliable, flexible, gas-proof, water-insoluble, thermal insulating material of which the outer surface reflects a major proportion of incident sunlight, in such position that said stem or top is surrounded by said wall and said bottom is effectively closed by being affixed to earth at the base of said plant. When said top is closed, said stem or top will usually be better protected from severely adverse climatic conditions.

Correspondingly, in one embodiment, the article of manufacture by the use of which to practice the present method consists essentially of a plant cover structure having a major vertical axis and substantially parallel thereto a self-supporting wall that defines an upper end and a lower end, each end essentially in a plane, said wall being curved and closed, said major vertical axis intersecting said lower end plane in an angle of not less than about 85 degrees, said structure being open at the upper and lower end and openably closable by flexure at the upper end, being composed essentially of flexible, tough, fairly rigid, yet pliable, gas-proof, water-insoluble, cellular foamed resinous polymeric material having good thermal insulating properties and an outer surface that reflects a major proportion of incident sunlight.

In the preferred embodiment, the material is a water-insoluble plastic foam of which the individual cells or voids defined by cell walls are entire: that is to say, separate or non-interconnected. Because such foams generally have a non-specular surface, reflection of incident light is more favorable to protection of plants when a self plastic foam material is white in color. However, such reflection can be greatly improved and the protection of plants enhanced by wholly or partially covering the outer surface of said article with a specular reflective material. Thus, in a highly preferred embodiment of the present invention, the said plastic foam material comprising individual entire, that is, non-interconnected cells is at least partly covered by a weather-resistant coating having a specular reflecting surface. In the most preferred embodiment presently known to the inventor, the said closed continuous curved sidewalls are in approximately the form of the side wall of a cylinder, portions of the bottom of the said wall extend to form tabs which can be folded inward or preferably outward and weighted, for example with soil or otherwise fastened to earth and the like to secure the said article to the earth around a plant to be protected; the top of said said cylinder is manufactured as standing open and is closed by flexing together the approximately opposing sides thereof and securing the said sides together with a clamp, a spring-loaded clip, or the like. Of course, if prepared without said tabs, the cover structure can be held in place by stakes or the like, within or outside said cover structure: or in other ways. Because such stakes would probably disturb roots of the plant to be protected, they are not preferred. Moreover, the cylindrical sidewall shape may be modified as by corrugation and the like to improve strength of the resulting structure.

A useful material, less desirable than plastic foam and in some situations quite impractical to use, is a low-density, insulating wall material such as a slag fiber, glass wool, or treated cotton or other vegetable fiber insulation, or the like, of which each major surface is covered with an essentially impermeable waterproof membrane material. One such membrane material that is not preferred is the film resulting from the application of a heavy coat of paint. Other useful materials will be evident to those skilled in the art.

Because the said sidewalls are necessarily in the form of a continuous closed curve, sunlight under even the most intense of winter conditions strikes the said wall directly in only a very small area where the said curve is approximately tangent to a line normal to a ray of said sunlight. Over the rest of its surface, the incident sunlight strikes glancingly and is for the most part, reflected off with very little absorption. As a result, the particular closed curved shape (best embodied in approximately a cylindrical shape) results in far less absorption of solar energy as heat within the plant cover than would occur when employing a flat-walled structure. Hence, the temperatures that are developed within the interior of the said cover, when it is closed, tend to be much lower and freer from extremes than the interior temperatures of similar structures with flat walls which, at some time of the day, are themselves almost completely normal to the rays of incident sunshine. The concept of a curved surface herein is meant to describe a curve, simple or composite, of which an average radius does not exceed approximately three times the radius of spread of the typical woody top to be protected.

Moreover, because the present structure has a sidewall of which all parts are essentially parallel to a major axis at about right angles to the plane of the base, the present structure when in position, tends to be and should be upright and thus present a vertical wall area having a minimum area for direct absorption of solar radiation. Hence, this essentially upright posture together with the described closed curved wall shape contributes also to the efficacy of the present device, under conditions particularly adverse to growth of a desired plant.

The expression "gas-proof" as used in the present specification and claims is employed in its general and common sense, to describe a substance which substantially resists or delays the passage through itself of a material in the vapor phase. Thus a continuous film or sheet of a resinous polymeric material, whether fabricated from molten state or by chemical reconstitution, generally meets the definition of the said expression. In contrast, a fabric comprising fibers and apertures between the said fibers generally does not. The expression is not intended to limit the employed materials to those which in an absolute and molecular sense are totally impervious to all transfer of molecules of gaseous or vapor substance. In consequence, a sheet or layer of foamed resinous polymeric material of which the individual cells are not interconnected will generally meet the said definition when it is more than one cell thick; whereas a sheet or layer of foamed, resinous, polymeric material of which the individual cells are interconnected will generally fail to meet the said definition, inasmuch as the interconnections between the cells usually coalesce to constitute tortuous channel traversing the thickness of the said foamed material.

Other expressions in the present specification and claims when not precisely defined are understood to have their common meanings and to be susceptible of interpretation by reference to the exemplary embodiments cited.

The flexible plastic foam with non-interconnected, that is to say, entire, cells of which the present article is best prepared offers numerous advantages over any other material hitherto known to have been used. It presents a highly effective vapor barrier with the result that, locally and within the said article, high humidities, both relative and absolute, tend to be maintained. Thus is avoided much of the damaging dehydration which accounts for a major proportion of the winter injury of plants to whose protection the present invention is directed. Also, the said plastic foams are at the same time excellent thermal insulators. Thermal conductivities on the order of 0.25 $k$, that is 0.25 British thermal units per square foot area per hour per inch thickness per degree Fahrenheit temperature difference are not unusual. Thus rapid fluctuations in temperature within the said article are greatly reduced. The interior space defined by and within the said article may, in the course of severe weather, achieve a temperature approximately as low as the temperature of the surrounding weather. However, changes from this low temperature to higher temperatures take place relatively slowly, typically much more slowly than in open air. Hence any natural tendency of the plant to accommodate weather changes can more easily succeed. Moreover, following such low temperatures, the stems of the plant are protected from the burning effects of direct exposure to sunlight and from resulting dehydration. Because the voids or cells within such plastic foam are non-interconnected, the accidental puncture of a shallow portion or layer comprising a small proportion of such cells by branches, thorns, garden tools and the like is essentially harmless to the whole insulating effect thereof. When relatively higher interior temperatures are achieved, temperature declines tend to take place slowly. That these phenomena in fact occur, and these results are achieved has been established by taking of temperature records over a period of months, the temperature sensing units being within the present devices, as the devices, under various exposures near the 45th parallel of North latitude, were actually used for the winter protection of plants under practical conditions.

Conveniently, the tabs or feet at the bottom end of the said article are so formed that the spaces or voids between the tabs of one such article define the tabs of another such article with the result that the articles can be cut in pairs from sheet plastic foam with no loss of material, as scrap. The said tabs, or feet, can have various shapes, as is well-known to those skilled in the art, one example being alternating rectangular feet and rectangular intervening spaces.

Any seam of similar closure in the present device should be relatively securely made, to prevent heat transfer through air movement.

It is believed that any water-insoluble, flexible plastic foam now known to the art of producing resinous thermoplastic materials can successfully be employed in the present invention. Foams which can be used successfully include polyethylene foam, polypropylene foam, polyurethane foam, foams of copolymers of these sorts such as copolymers of olefins and lower acrylic acid esters such as copolymers of ethylene and ethyl acrylate; foam rubber, polyvinyl chloride, copolymers of rubber, and ethyleneically unsaturated copolymerizable substances, foamed halogenated rubber, reconstituted cellulose foams, and the like. Conveniently, such foams can be fabricated in the form of a sheet or continuous sheeting tube of which the wall thickness is approximately one-quarter inch. Such tubular structure obviates a wall suture which might otherwise be a source of air or water-vapor movement and hence of heat transfer. The thickness is, however, not critical so long as the resulting foam has thermal insulation that is adequate. Thickness of one millimeter or more is believed to be adequate for many uses. Cover structures having walls of lesser thickness lack the necessary strength and insulating value. Wall thicknesses of one-sixteenth to one-eighth inch are usable over wide areas of the United States, while wall thicknesses of one-quarter inch or more are adequate for most uses under conditions of unusually severe climatic exposure. Wall thickness of an inch or more affords good protection and is operable; but may often be thicker than is needed.

It is essential and critical, in the practice of the present invention, that the flexible plastic foam material to be employed as a plant cover structural material reflect at least a major proportion of sunlight. This is accomplished successfully by the use of plastic foam which, as a molten mass before being foamed, is colorless but upon being foamed becomes white; it is also accomplished by the application to or inclusion within at least the exterior surface of the entire substance of the said foam of a highly reflective material as either a finely divided particulate reflective substance such as titanium dioxide, shiny metallic flake and the like, or a continuous sheet as, for example, reflective metallic foil and the like. Other metallic flake or foil or other reflective substances may, of course, be used subject only to the limitation that such substances impart to the plastic foam upon the surface or within the body of which they are incorporated a relatively high reflectivity to incident sunlight. Such foil, if used, has the related advantage of affording specular reflection. Because of the high polarized content of winter sunlight, such reflection affords better protection than non-specular reflection.

It is impractical to state in rigorous quantitative terms what proportion or degree of sunlight incident upon the exterior surface of the plastic foam article must be reflected for best results; in general, cover materials of black and other relatively very dark colors are expressly to be avoided as being unsuitable, particularly when of a dull surface texture; also, intense over-all pigmentation as by the employment of colorants for decorative or marking purposes is to be avoided. When it is desired to employ a distinctive color in the present article as means of identifying, for example, the kind of plant which is protected within the said article or to permit ready location of the said plant by color contrast with surroundings, such identifying colors, including dark colors, may be applied in a distinctive pattern or shape or over a relatively small area of the said plastic foam or within its substance to achieve a distinctive marking with out appreciably increasing the absorption of sunlight thereby. (In the present specification and claims, white and black and their shades and minor variations are considered to be colors.)

It is essential and critical to the optimum use of the present invention that the closure of the top of the said article be susceptible of ready and relatively complete opening and reclosure repeatedly, in order to permit regulation of heating of the interior space of the said article during the periods of relatively mild weather in climatic areas susceptible of unexpected wide changes in weather.

The embodiment of the article of the present invention presently believed to be the best can readily be understood by reference to the accompanying drawings. The drawings are representative of a preferred embodiment but will immediately be recognized by those skilled in arts of horticulture as embodying only one of numerous available shapes of which all would meet the present definition. FIGURE 1 illustrates the article of the present invention in an open position, whereas FIGURE 2 indicates it in a closed position, employing one manner of closure. FIGURES 3 and 4 show top views of the article in, respectively, open and closed positions. FIGURE 5 shows the development of the shape of the wall of the present article; without immaterial limitation in such things as dimensions (which are adapted to the dimensions of the plant sought to be protected) or shape of foot tab (of which the shape or even the existence is optional), this development indicates a pattern by which the present article can be fabricated from a flat material.

The article 10 is fabricated of sidewall material 15, which is essentially a polymeric foam sheet having a wall thickness 16, formed as a cylinder, one convenient size being about twelve inches in diameter and eighteen inches high, open at top 20, and at bottom 11, and provided with foot tabs 25 continuously from the same sheet as sidewall material 15. Together with clips 30, or equivalent, this represents the essential structure of the device.

In view of the present specification and claims, it is evident that to fabricate the present article from a flat sheet cut according to FIGURE 5 or its reasonable equivalents, edges 17 are to be brought together and affixed together. This may be done by stapling, stitching, welding or fusion, the use of an adhesive, the use of double ended spring clips and the like, or in other ways known to those skilled in the art. When thus fabricating the present article, conveniently and to avoid waste, the development in flat shapes are cut in pairs, so disposed in respect to the sheet of wall material (which is assumed to be of uniform width and with straight side edges) that foot tabs 25 are cut approximately along a midline of the said uncut sheet material so that the voids or spaces between foot tabs on the development or blank cut on one side correspond to the foot tags on the other side.

When the present article is thus formed, any seam or suture resulting from the approximation of the edges 17 should be essentially closed to free passage of gases in order to minimize heat loss and desiccation of the space interior to the said article as a result of gas transfer therethrough.

Multiple closure means such as, for example, stapling and cementing both together may be employed if desired. In use the present article is disposed over and around plant 35, a plant having semi-hardy, woody tops or stems. The woody stems of shrub 35, such as deciduous stems produced in summer growth or stems with evergreen leaves are permitted to become dormant, or, if evergreen, quiescent with the onset of fall and early winter and, before the beginning of weather likely to be severely damaging to the above-ground woody parts of the said stems, if said stems are taller than the present cover structure, the said stems are pruned back to a height slightly lower than the interior top of the sidewall of the said structure. Using clips 30, then, the sides of said sidewall are brought together and closed in approximately a line of closure, whereby the top is pinched and held shut. Conveniently but not critically, this is done by spring-loaded clips. In this condition, the shrub is permitted to stand against winter weather. It may be so left all winter. In another method, related, it may be so left until, for example, a time in winter during which, unseasonably, the weather becomes quite warm and sunshine is bright. The "Chinook" of the northwestern United States is representative of such time. During this interval, desirably but not critically, at least some of the clips 30 are removed (and, for storage, perhaps fastened to a single sidewall) so that the top opening 20 is permitted to assume an open position whereby ventilation of the interior space of the said article is increased, and as a result excessive interior temperatures are avoided in the season of warm weather and bright sunlight.

Upon the subsequent recurrence of cold weather, the said top opening 20 is again closed with clips 30 and permitted to remain thus closed until recurring warm weather indicates the desirability or need for opening to prevent overheating. With usually a small number of alternating openings and closing of the top to accommodate weather changes, the winter is passed and thereafter the entire cover is removed. At the time it is removed, the stems or tops of the said plant are in their winter condition, such as dormant, and remain so normally as do other plants of the same kind which were permitted to withstand the winter unprotected. At a normal time of spring, both groups of shrubs break dormancy; winter kill of the plant protected within the article of the present invention appears at the extreme tops of the taller stems and proceeds toward the crown no further than a few internodes; in contrast, the tops of unprotected shrubs are killed nearly to ground line and some of the shrubs die entirely. Shrubs protected by the article of the present invention survive well under adverse climatic influences under which unprotected similar plants cannot survive. In the growing season that follows, the plants such as deciduous shrubs protected according to the present invention, because they have a higher woody structure from which to begin growth, produce larger and stronger shrubs and are bettter adapted to the use such as ornamental use for which the said shrubs are intended.

Among the kinds of semi-hardy woody plant tested for winter survival with and without the present device under conditions otherwise similar are boxwood (Buxus), hybrid tea roses, holly (Ilex, presumably opaca), rosemary, bamboo, and Sequoia. Survival is in every case enhanced.

Good results are obtained when the plant sought to be protected by the use of the present device is a woody, deciduous shrub, when it is permitted to become dormant, pruned to a height no greater than the device can cover, covered with the device which device is securely affixed to the earth around the base of the said plant, and the top of the said device closed essentially tightly, and the protected plant permitted in this condition to pass the winter. The opening and reclosing of the said device, responsive to evident changes in the weather, may be desirable but is not essential or critical.

The acceptable relative thermal conductivity of the wall and cover material to be employed in making the present device can not be stated with exactitude. In general, attempts to employ glass alone, aluminum foil alone, solid sheet polyethylene and the like give results which are unsatisfactory. Further, in general, as thermal insulating properties are increased, the tendency of the cover material to permit the development of excessively high interior temperatures is diminished with the result that the use of, for example, a polyethylene foam wall material of which the walls are approximately two inches thick gives results which, while not harmful, are less conveniently achieved and not necessarily better than the results obtained from much thinner and less expensive sidewall substances. In general, good results are obtained when employing a sidewall material of foamed waterproof resinous thermoplastic material essentially stable under normal weather conditions of which the cells are essentially sparate, that is to say, free from interconnections, of which the total thickness is from $\frac{1}{16}$ to $\frac{1}{2}$ inch. Employment of wall materials of greater thickness is without either advantage or disadvantage except as it is less convenient and more expensive, so far as is known. Correspondingly, the employment of other substances meeting the necessary criteria hereinbefore set forth and having insulating properties approximately the equivalent of those of the plastic films of the described thickness are also satisfactory.

The closed, curved shape which is essential and critical to the form of a successful device according to the present invention must be curved in at least one plane, and, in that case, in the horizontal plane whereby vertical lines thereof are essentially straight lines; however, if desired, a shape having a plurality of curved lines closed in at least one plane may be employed.

When it is desired to provide dormant season treatment of the woody stems to be protected within the present device, such as, for example, the dormant season application of a gaseous fumigant or a finely divided airborne liquid spray, a closable opening is conveniently provided for the introduction of such dormant season treatment. Such closable opening may be an aspect or portion of the top opening or may be separately provided in the sidewall. It is to be noted that when such substance is applied as a dormant season spray within the present protective cover, the said cover has a substantial tendency to prevent loss of the plant protective spray material or the like through such influences as vaporization, weathering, and so forth. In consequence, it is often possible, when employing the device of the present invention to apply amounts of spray material which are smaller or of lower concentration than would be deemed necessary in the absence of the present device. However, this phenomenon poses no special problems and spray routines such as are used absent the present device work effectively when employed conjointly therewith.

It will at once be apparent to those skilled in the art that, for the protection of a taller plant needing such protection, a taller covering device is prepared in the same manner as the device presently illustrated; also, for surrounding a larger woody plant or a woody plant having an unusual shape, a cover having a greater circumference and not necessarily circular in projected outline is readily used. Also, foot tabs of shapes other than those here shown are readily employed. The present invention makes obvious to those skilled in the art numerous other variations and modifications hereof which are deemed to be included within the present invention; I limit myself only according to the appended claims.

I claim:

1. As an article of manufacture for the winter protection of aerial parts of perennial plants that are growing in earth and have semi-hardy aerial parts that are produced during a principal growing season and are susceptible of winter killing, a protective cover structure having a major vertical axis and substantially parallel thereto a self-supporting wall that defines an upper end and a lower end, each end essentially in a plane, said wall being curved, and closed, said major vertical axis intersecting said lower end plane in an angle of not less than about 85 degrees, said structure being open at the upper and lower end and openably closable by flexure at the upper end, being composed essentially of flexible, tough, fairly rigid, yet pliable, gas-proof, water-insoluble, cellular foamed resinous polymeric material of which the individual foam cells are entire, said material having good thermal insulating properties and an outer surface that reflects a major proportion of incident sunlight.

2. Article of claim 1 wherein the wall material is white.

3. Article of claim 1 wherein the outer surface of said wall is at least partially coated with a specular reflecting material.

4. Article of claim 3 wherein the reflecting material is a metallic film.

5. Article of claim 1 wherein the foamed material is a polyolefin foam.

6. Article of claim 1 wherein the fomed material is foamed polyethylene.

7. Article of claim 1 wherein the foamed material is foamed polypropylene.

References Cited by the Examiner

UNITED STATES PATENTS

| | | | |
|---|---|---|---|
| 189,653 | 4/1877 | Pudigon | 47—26 |
| 884,473 | 4/1908 | Dawson | 47—28 |
| 1,548,682 | 8/1925 | Gulin | 47—30 |
| 1,615,589 | 1/1927 | Lewis | 47—28 |
| 1,747,967 | 2/1930 | Bell | 47—28 |
| 2,256,483 | 9/1941 | Johnston | 260—2.5 |
| 2,691,848 | 10/1954 | Arena | 47—29 |
| 2,849,028 | 8/1958 | Clark et al. | 260—2.5 |
| 2,940,219 | 6/1960 | Schiller | 47—27 |
| 3,072,972 | 1/1963 | Yokose et al. | 260—2.5 |

ABRAHAM G. STONE, *Primary Examiner.*

A. JOSEPH GOLDBERG, T. GRAHAM CRAVER,
*Examiners.*